United States Patent
Kim et al.

(10) Patent No.: US 9,145,138 B2
(45) Date of Patent: Sep. 29, 2015

(54) PARKING ASSIST APPARATUS AND METHOD

(71) Applicant: MANDO CORPORATION, Pyeongtaek-Si, Gyeonggi-do (KR)

(72) Inventors: Jae Suk Kim, Yongin-si (KR); Kwan Sun You, Yongin-si (KR); Tae Bong Noh, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/306,021

(22) Filed: Jun. 16, 2014

(65) Prior Publication Data

US 2015/0066280 A1    Mar. 5, 2015

(30) Foreign Application Priority Data

Sep. 4, 2013  (KR) .................... 10-2013-0105867

(51) Int. Cl.
*B60W 30/06*    (2006.01)
*B62D 15/02*    (2006.01)

(52) U.S. Cl.
CPC ............. *B60W 30/06* (2013.01); *B62D 15/027* (2013.01); *B62D 15/0285* (2013.01)

(58) Field of Classification Search
CPC . B60W 30/06; B60T 2201/10; B62D 15/027; B62D 15/0285
See application file for complete search history.

(56) References Cited

U.S. PATENT DOCUMENTS

| | | | |
|---|---|---|---|
| 7,970,535 B2 * | 6/2011 | Katoh et al. ................... | 701/514 |
| 8,326,492 B2 * | 12/2012 | Schoening et al. ............. | 701/42 |
| 8,825,221 B2 * | 9/2014 | Hunger et al. .................... | 701/1 |
| 2011/0054739 A1 * | 3/2011 | Bammert et al. ............... | 701/41 |
| 2012/0004809 A1 * | 1/2012 | Sasajima ......................... | 701/41 |
| 2014/0129091 A1 * | 5/2014 | Yamazaki et al. .............. | 701/42 |

* cited by examiner

*Primary Examiner* — Michael J Zanelli
(74) *Attorney, Agent, or Firm* — McDermott Will & Emery LLP

(57) ABSTRACT

Disclosed is a parking assist apparatus for a vehicle. The parking assist apparatus includes: a start sensor configured to sense a starting state of the vehicle; a vehicle speed sensor configured to sense a speed of the vehicle; a gear sensor configured to sense a gear state of the vehicle; and a parking control unit configured to control driving-out of the vehicle when the starting state of the vehicle is changed from an OFF state to an ON state, the speed of the vehicle is less than a reference speed, and the gear state is "Neutral" or "Park" when a signal instructing automatic parking of the vehicle is received from a driver.

12 Claims, 4 Drawing Sheets

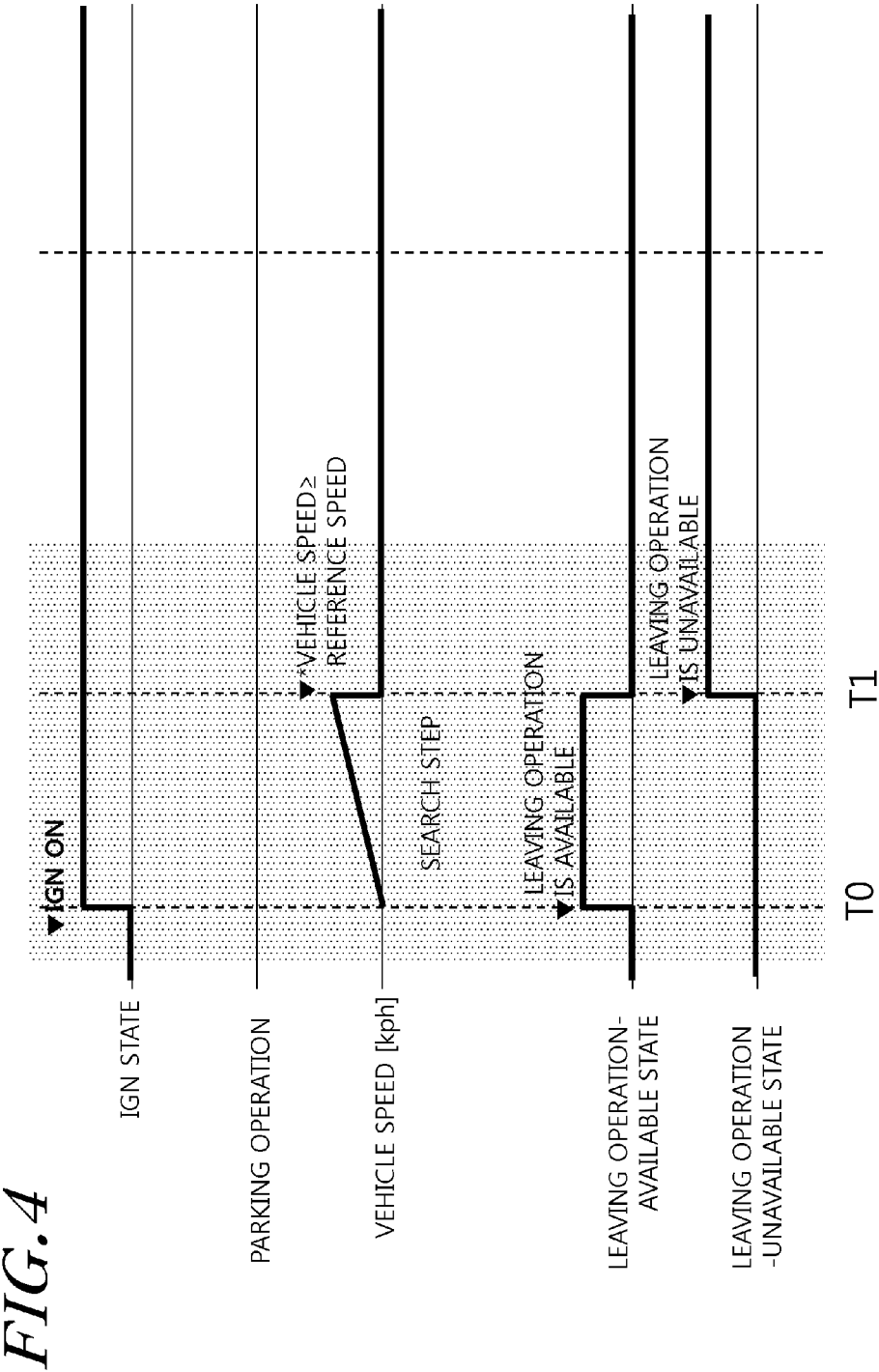

PARKING ASSIST APPARATUS AND METHOD

CROSS-REFERENCE TO RELATED APPLICATION

This application claims priority from and the benefit under 35 U.S.C. §119(a) of Korean Patent Application No. 10-2013-0105867, filed on Sep. 4, 2013, which is hereby incorporated by reference for all purposes as if fully set forth herein.

BACKGROUND OF THE INVENTION

1. Field of the Invention

The present invention relates to a parking assist apparatus and method for a vehicle.

2. Description of the Prior Art

As a vehicles recently has been positioned as a necessity of people in the modern world, newly released and run vehicles have rapidly increased. Due to this, various social problems such as a traffic jam and a parking problem have occurred.

In particular, the parking problem is very serious. As vehicles increase in a limited region, town and state, it is unavoidable that a parking space should be reduced. In order to solve such a problem of insufficient parking spaces, a parking section divided to allow one vehicle to be parked therein becomes narrower and narrower.

In addition, even in a space where parking sections are not divided, it is unavoidable that an inter-vehicle space is narrowed when a number of vehicles are parked together therein. In such a case, there is a problem in that it is difficult for a driver to directly drive so as to park a vehicle in a narrow parking space or to drive the vehicle out from the narrow parking space while looking for an obstacle around the vehicle with his/her eyes.

Thus, a technology, which has been developed and has become commercially available, installs a parking assist system which performs automatic parking in a vehicle so as to automatically park the vehicle into a parking space or drive the vehicle out of the parking space. The parking assist system automatically steers the vehicle when the vehicle is parked into or driven out from the space so as to assist in parking the vehicle in the parking space or driving the vehicle out of the parking space. Such a parking assist system may be referred to as a Smart Parking Assist System (SPAS), an Intelligent Parking Assist System (IPAS), an Advanced Parking Guidance System (APAS), or the like.

A parking assist function may be generally classified into a function of parking a vehicle in a parking space ("parking function") and a function of driving a vehicle out of a parking space ("driving-out function"). As an example, the parking function may be executed in a state where starting is turned ON (IGN ON) and may be selected when the gear is positioned at "Drive" ("D"). Meanwhile, the driving-out function may be executed when a vehicle speed is equal to or lower than a reference speed in the IGN ON state and the gear is positioned at "Neutral" ("N") or "Park" ("P").

Meanwhile, in a situation in which a vehicle is stopped due to grid lock on a road or a red light, when a driver inadvertently pushes a button which operates the parking assist system, a driving-out system may be operated. If the driver drives the vehicle again while the driving-out system is operated, an automatic control of the driving-out function may be initiated and the steering wheel may be automatically steered, causing a dangerous situation.

SUMMARY OF THE INVENTION

The present invention has been made so as to solve the above-mentioned problems, and an object of the present invention is to provide a parking assist apparatus and a parking assist method that prevent a driving-out system from being inadvertently operated by a driver.

In order to achieve the above-mentioned object, an exemplary embodiment of the present invention provides a parking assist apparatus for a vehicle. The parking assist apparatus includes: a start sensor configured to sense a starting state of the vehicle; a vehicle speed sensor configured to sense a speed of the vehicle; a gear sensor configured to sense a gear state of the vehicle; and a parking control unit configured to control driving-out of the vehicle when the starting state of the vehicle is changed from an OFF state to an ON state, the speed of the vehicle is less than a reference speed, and the gear state is "Neutral" or "Park" when a signal instructing automatic parking of the vehicle is received from a driver.

After the starting state of the vehicle has been changed from the OFF state to the ON state, when a case in which the speed of the vehicle exceeds the reference signal exists or a case in which the gear state of the vehicle is neither "Neutral" nor "Park" exists, the parking control unit may not control the driving-out of the vehicle.

When a moving distance of the vehicle exceeds a reference distance after the staring state of the vehicle has been changed from the OFF state to the ON state, the parking control unit may not control the driving-out of the vehicle.

When a control of automatically changing the starting state to the OFF state is performed when the vehicle is stopped, the parking control unit may not control the driving-out of the vehicle.

When the signal instructing the automatic parking of the vehicle is received from the driver after it has been determined not to control the driving-out of the vehicle because the starting state of the vehicle is not changed from the OFF state to the ON state, the speed of the vehicle is not less than the reference speed, or the gear state of the vehicle is not "Neutral" or "Park", the parking control unit may not control the driving-out of the vehicle. When the starting state is changed from the OFF state to the ON state or the automatic parking of the vehicle is performed after it has been determined not to control the driving-out of the vehicle because the starting state of the vehicle is not changed from the OFF state to the ON state, the speed of the vehicle is not less than the reference speed, or the gear state of the vehicle is neither "Neutral" or "Park", the parking control unit may control the driving-out of the vehicle when the signal instructing the automatic parking of the vehicle is received from the driver.

Another exemplary embodiment of the present invention provides a parking assist method for vehicle, including: sensing a starting state of the vehicle; sensing a speed of the vehicle; sensing a gear state of the vehicle; and determining whether automatic driving-out of the vehicle is available so as to determine that the automatic driving-out of the vehicle is available when the starting state of the vehicle is changed from an OFF state to an ON state, the speed of the vehicle is less than a reference speed, and the gear state is "Neutral" or "Park" when a signal instructing automatic parking of the vehicle is received from a driver; and controlling the driving-out of the vehicle when it is determined that the automatic driving-out of the vehicle is available.

According to the present invention as described above, it is possible to prevent the driving-out system from being inadvertently operated by the driver.

BRIEF DESCRIPTION OF THE DRAWINGS

The above and other objects, features and advantages of the present invention will be more apparent from the following detailed description taken in conjunction with the accompanying drawings, in which:

FIG. 4 is a graph illustrating signal flows according to an exemplary embodiment of the present invention.

DETAILED DESCRIPTION OF THE EXEMPLARY EMBODIMENTS

Figure 1:
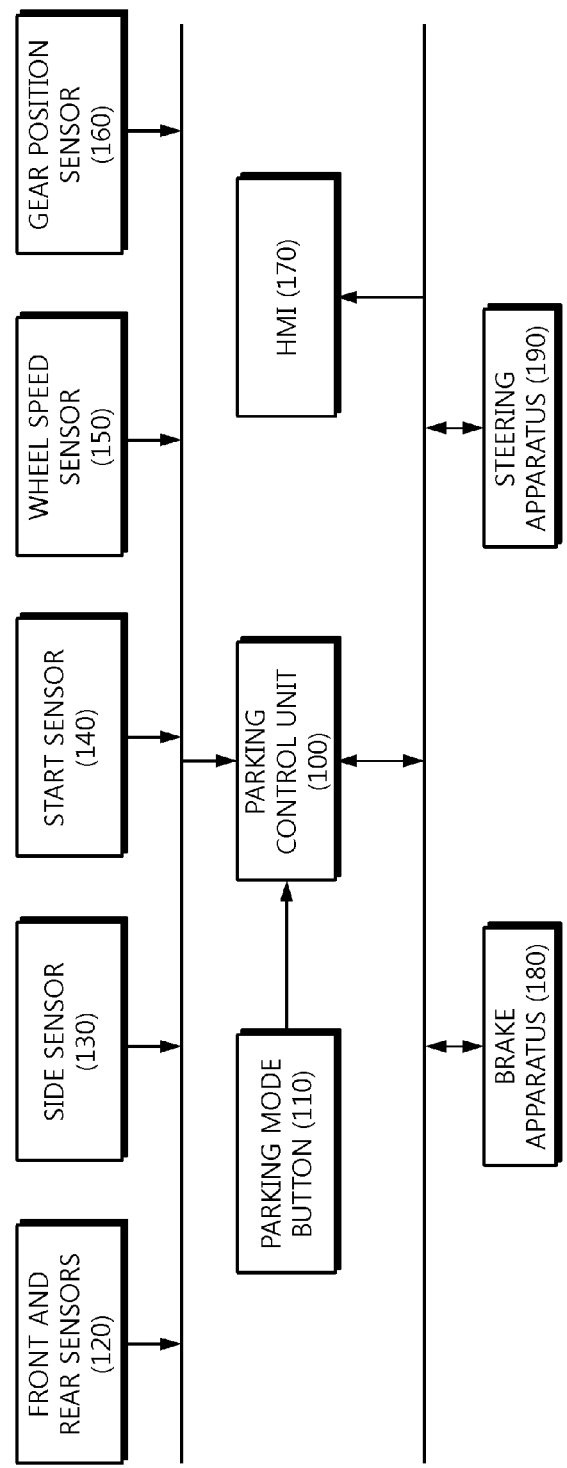
FIG. 1 is a block diagram of a parking assist apparatus of an exemplary embodiment of the present invention.

Hereinafter, some exemplary embodiments of the present invention will be described in detail through illustrative drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. In the case that it is described that a certain structural element "is connected to", "is coupled with", or "is in contact with" another structural element, it should be interpreted that another structural element may "be connected to", "be coupled with", or "be in contact with" other structural elements as well as that the certain structural element is directly connected to or is in direct contact with another structural element.

FIG. 1 is a block diagram of a parking assist apparatus of an exemplary embodiment of the present invention. The parking assist apparatus may be referred to as a Smart Parking Assist System (SPAS), an Intelligent Parking Assist System (IPAS), an Advanced Parking Guidance System (APAS), or the like.

Referring to FIG. 1, the parking assist apparatus includes: a parking control unit 100, a parking mode button 110 through which a driver inputs a parking control initiation or termination instruction, front and rear sensors 120 mounted on front and rear surfaces of a vehicle, a side sensor 130 mounted on a side surface of the vehicle, a start sensor 140 configured to sense a starting state of the vehicle, a wheel speed sensor 150 configured to sense a speed of the vehicle, a gear position sensor 160 configured to sense a gear state, a human machine interface (HMI) 170 configured to output various messages related to a parking control (e.g., a gear change message, a parking termination message, or the like), a brake apparatus 180 configured to transmit a braking signal to the parking control unit 100 in response to the driver's braking action, and a steering apparatus 190 configured to receive an input of a steering instruction signal from the parking control unit 100. The parking control unit 100 is connected with the parking mode button 110, the front and rear sensors 120, the side sensor 130, the start sensor 140, the wheel speed sensor 150, the gear position sensor 160, the HMI 170, the brake apparatus 180, the steering apparatus 190, etc. to exchange signals, information or data required for the parking control.

The parking assist function performed by the parking assist apparatus may be generally classified into a function of parking a vehicle positioned outside a parking space into the parking space (parking function) and a function of moving a vehicle positioned inside a parking space to the outside of the parking space (driving-out function).

The parking control unit 100 may cause the parking function or the driving-out function to be selected only at a specific vehicle state when the parking mode button 110 is pushed by the driver.

In an example, the parking function may be selected only when the start sensor 140 detects that the vehicle is in the IGN ON state, the wheel speed sensor 150 detects that the speed of the vehicle is less than a parking reference speed, and the gear position sensor 160 detects that the gear position is "Drive" ("D").

In another example, the driving-out function may be selected only when the start sensor 140 detects that it is in the IGN ON state, the wheel speed sensor 150 detects that the speed of the vehicle is less than a driving-out reference speed, the gear position sensor 160 detects that the gear position is "Neutral" ("N") or "Park" ("P"). The driving-out reference speed may have a value different from the above-mentioned parking reference speed.

Meanwhile, in a situation in which the vehicle is stopped due to grid lock on a road or a red light while the driver drives the vehicle, when the driver pushes the parking mode button 110, the parking control unit 100 may perform the driving-out function. When the driving-out function is executed, the steering wheel may be automatically steered. Thus, when the driver drives the vehicle again while the driving-out function is executed a dangerous situation may occur.

In order to overcome such a problem, it is necessary to further limit the conditions in which the driving-out function is executed.

In an exemplary embodiment of the present invention, only when the start sensor 140 detects that the state in which the starting state is changed from the turned-off state (IGN OFF) to the turned-on state (IGN ON), the wheel speed sensor 150 detects that the speed of the vehicle is less than the reference speed, and the gear position sensor 160 detects that the gear position is "Neutral" ("N") or "Park" ("P"), the parking control unit 100 may perform the driving-out control when the parking mode button 110 is pushed. According to this, the driving-out function is not performed in a state where the starting is continuously turned on. Accordingly, when the vehicle is temporarily stopped, the driving-out function may not be executed even if the parking mode button 110 is pushed.

When a case where the speed of the vehicle was equal to or higher than the reference speed after starting was turned on has existed, it may be determined that the vehicle starts driving outside the parking space. In such a case, the parking control unit 100 may not perform the driving-out function even if the parking mode button 110 is pushed.

When the moving distance of the vehicle is equal to or longer than a reference distance after starting is turned on, it may be determined that the vehicle starts driving outside the parking space. In such a case, the parking control unit 100 may not perform the driving-out function even if the parking mode button 110 is pushed.

Meanwhile, an Idle Stop and Go (ISG) system (also referred to as a start-stop system or a stop-start system) is a system that automatically turns off and restarts a vehicle engine so as to reduce idling of the vehicle engine. When the driver inadvertently pushes the parking mode button 110 in a state where starting is turned off and then turned on again, the parking control unit 100 may perform the driving-out function. Thus, while the ISG system is driven, the parking control unit 100 may not perform the driving-out function even if the parking mode button 110 is pushed.

Due to the above-described conditions, it is possible to reduce the probability of performing the driving-out function when the parking mode button 110 is pushed in a state where the vehicle is not parked. That is, it is possible to reduce the probability of performing the driving-out function when the parking mode button 110 is pushed while the vehicle is temporarily stopped.

Meanwhile, when the driving-out function is not performed due to the above-described conditions, i.e., when it is determined that the vehicle is not in the parked state, it will be appreciated that in one IGN cycle in which starting is changed from the IGN ON state to the IGN OFF state, the vehicle is being moved rather than being parked.

Thus, when it is determined one time that the driving-out function is not performed in one IGN cycle, the driving-out function may not be performed even if the parking mode button 110 is pushed thereafter within the IGN cycle.

Meanwhile, when the starting state of the vehicle becomes the IGN OFF state to complete the IGN cycle after it has been determined one time that the driving-out function has not been performed in the one IGN cycle, it may be estimated that the vehicle is parked. When the parking mode button 110 is pushed thereafter, it may be determined whether to perform the driving-out function using the above-mentioned conditions.

In addition, when the automatic parking of the vehicle is performed after it has been determined one time that the driving-out function has not been performed in the one IGN cycle, it may be estimated that the vehicle is parked. When the parking mode button 110 is pushed thereafter, it may be determined whether to perform the driving-out function using the above-mentioned conditions.

Figure 2:
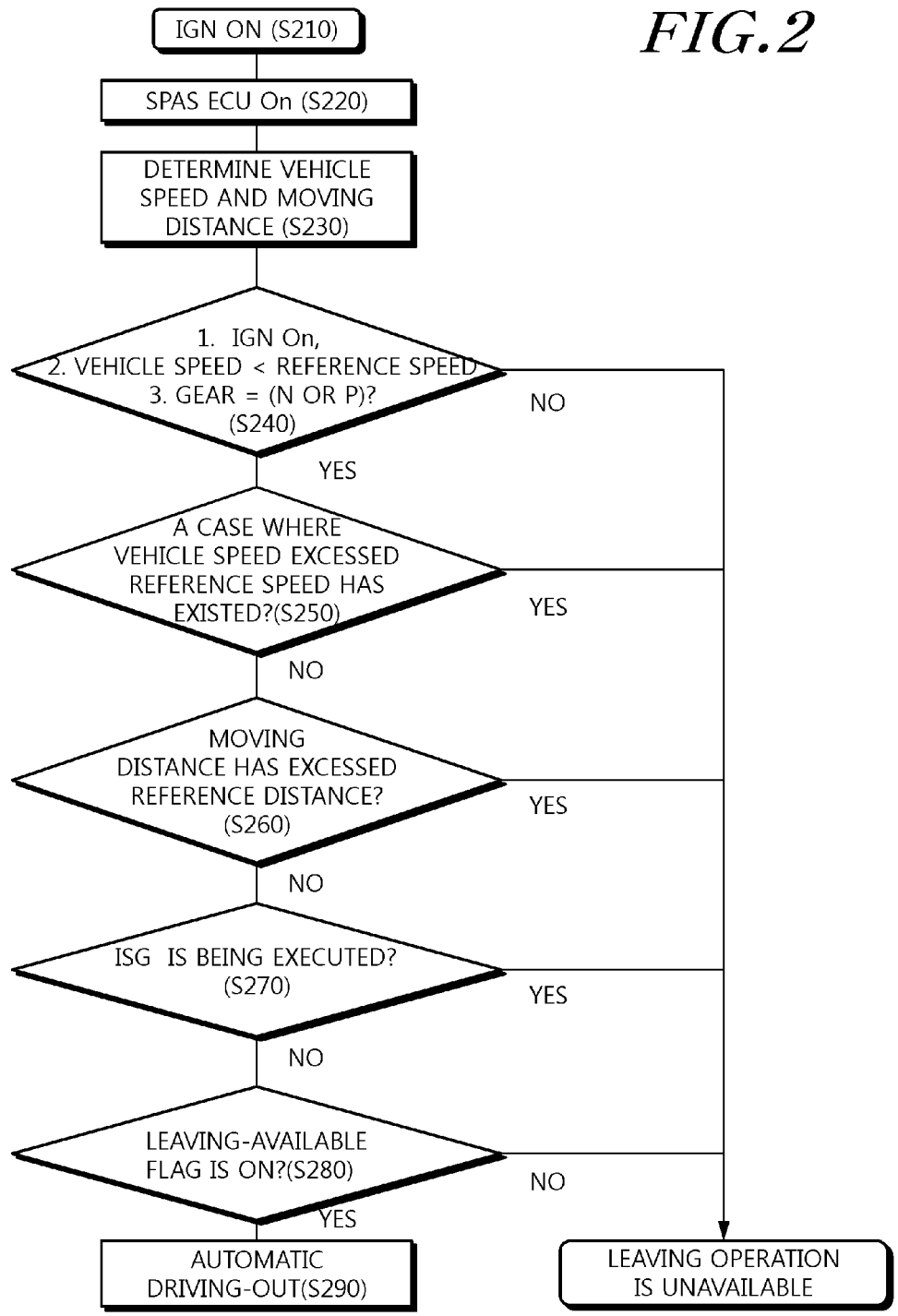
FIGS. 2 and 3 are flowcharts illustrating a parking assist method according to an exemplary embodiment of the present invention.
Figure 3:
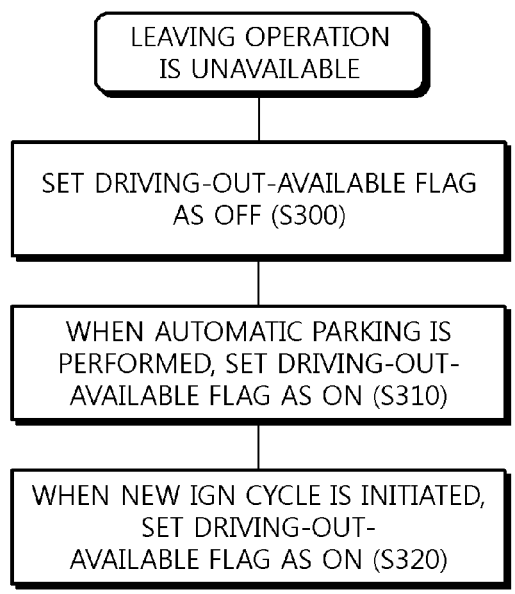

FIGS. 2 and 3 are flowcharts illustrating a parking assist method according to an exemplary embodiment of the present invention.

Referring to FIG. 2, when a starting state becomes the IGN ON state (S210), an Electric Control Unit (ECU) of the parking assist apparatus (SPAS) becomes in the ON state (S220). The parking assist apparatus determines the speed and moving distance of the vehicle (S230).

When the parking mode button 110 is pushed by the driver, the parking control unit 100 determines (1) whether the starting state of the vehicle is in the IGN ON state, (2) whether the speed of the vehicle is less than the reference speed, and (3) whether the gear is in the "Neutral" ("N") or "Park" ("P") state (S240). When all the above-described three conditions are satisfied, the parking control unit 100 determines that the driving-out operation is available (Yes in S240), and when at least one of the three conditions is not satisfied, the parking control unit 100 determines that the driving-out operation is unavailable (No in S240).

In addition, the parking control unit 100 may further determine whether a case in which the speed of the vehicle exceeded the reference speed has existed after the starting state became the IGN ON state parking control unit 100 (S250). When the case in which the speed of the vehicle exceeded the reference speed has not existed, the parking control unit 100 may determine that the driving-out operation is available (No in S250), and when the case in which the speed of the vehicle exceeded the reference speed has existed, the parking control unit 100 may determine that the driving-out operation is unavailable (Yes in S250).

In addition, the parking control unit 100 may further determine whether the moving distance of the vehicle has exceeded the reference distance after the starting state of the vehicle became the IGN ON state (S260). When the moving distance of the vehicle does not exceed the reference distance, the parking control unit 100 may determine that the driving-out operation is available (No in S260), and when the moving distance of the vehicle exceeds the reference distance, the parking control unit 100 may determine that the driving-out operation is unavailable (Yes in S260).

In addition, the parking control unit 100 may further determine whether the ISG system, which automatically turns off the starting state of the vehicle when the vehicle is stopped, is executed (S270). When the ISG system is not executed, the parking control unit 100 may determine that the driving-out operation is available (No in S270), and when the ISG system is executed, the parking control unit 100 may determine that the driving-out operation is unavailable (Yes in S270).

After steps S240 to S270 as described above, the parking control unit 100 determines whether a driving-out-available flag is ON (S280). When the driving-out-available flag is ON, the parking control unit 100 determines that the driving-out operation is available (Yes in S280), and when the driving-out-available flag is OFF, the parking control unit 100 determines that the driving-out operation is unavailable (No in S280). That is, when the case in which it was determined that the driving-out operation is unavailable existed in the IGN cycle before, it may be determined likewise that the driving-out operation is unavailable, and only when the case in which it was determined that the driving-out operation is unavailable did not exist in the IGN cycle before, it may be determined that the driving-out operation is available. Setting of the driving-out-available flag will be described below.

When it is finally determined that the driving-out operation is available through the above-described process, the parking control unit 100 performs the automatic driving-out function (S290).

The sequence of steps S240 and S280 in the above-described technology is provided merely for convenience of description and may be changed. In addition, all steps S240 to S280 may not be performed but merely some of steps S240 to S280 may be performed.

Referring to FIG. 3, when it is determined through the above-described steps S240 to S280 that the driving-out operation is unavailable, the parking control unit 100 may set the driving-out-available flag as OFF (S300).

When the automatic parking of the vehicle is performed after the driving-out-available flag is set as OFF, the parking control unit 100 may set the driving-out-available flag as ON again (S310).

When the starting state of the vehicle is changed from the OFF state to the ON state and thus, a new IGN cycle is initiated after the driving-out-available flag is set as OFF, the parking control unit 100 may set the driving-out-available flag as ON again (S320).

As such, when it is determined that the driving-out operation is unavailable since the vehicle is not in the parked state in one IGN cycle, the driving-out operation may not be performed until the vehicle is parked again.

FIG. 4 is a graph illustrating signal flows according to an exemplary embodiment of the present invention.

Referring to FIG. 4, the IGN state is in the ON state after time T0, and the speed of the vehicle starts to increase from 0 at time T0 and becomes the reference speed at time T1. In such a case, from time T0 to time T1, it becomes the state in which the driving-out operation is available (or, the driving-out-available flag is ON), and after time T1, it becomes the state in which the driving-out operation is unavailable (or, the driving-out-available flag is OFF). As such, from time T0 to time T1, the automatic driving-out function can be performed when the driver pushes the parking mode button but after time T1, the automatic driving-out function cannot be performed even if the driver pushes the parking mode button.

As described above, according to exemplary embodiments of the present invention, it is possible to provide a parking assist apparatus and a parking assist method that prevents the driving-out system from being operated even if the driver inadvertently pushes the button for automatic parking in a state where the vehicle is temporarily stopped rather than being parked.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A parking assist apparatus for a vehicle, comprising:
a start sensor configured to sense a starting state of the vehicle;
a vehicle speed sensor configured to sense a speed of the vehicle;
a gear sensor configured to sense a gear state of the vehicle; and
a parking control unit configured to control driving-out of the vehicle when the starting state of the vehicle is changed from an OFF state to an ON state, the speed of the vehicle is less than a reference speed, and the gear state is "Neutral" or "Park" when a signal instructing automatic parking of the vehicle is received from a driver.

2. The apparatus of claim 1, wherein, when a case in which the speed of the vehicle exceeds the reference speed exists after the starting state of the vehicle has been changed from the OFF state to the ON state, the parking control unit does not control the driving-out of the vehicle.

3. The apparatus of claim 1, wherein, when a moving distance of the vehicle exceeds a reference distance after the starting state of the vehicle has been changed from the OFF state to the ON state, the parking control unit does not control the driving-out of the vehicle.

4. The apparatus of claim 1, wherein, when a control of automatically changing the starting state to the OFF state is performed when the vehicle is stopped, the parking control unit does not control the driving-out of the vehicle.

5. The apparatus of claim 1, wherein, when a signal instructing an automatic parking of the vehicle is received from the driver after it has been determined not to control the vehicle because the starting state of the vehicle is not changed from the OFF state to the ON state, the speed of the vehicle is not less than the reference speed, or the gear state of the vehicle is neither "Neutral" nor "Park", the parking control unit does not control the driving-out of the vehicle.

6. The apparatus of claim 1, wherein, when the starting state of the vehicle is changed from the OFF state to the ON state or the automatic parking of the vehicle is performed after it has been determined not to control the vehicle because the starting state of the vehicle is not changed from the OFF state to the ON state, the speed of the vehicle is not less than the reference speed, or the gear state of the vehicle is neither "Neutral" nor "Park", the parking control unit controls the driving-out of the vehicle when the signal instructing the automatic parking of the vehicle is received from the driver.

7. A parking assist method for vehicle, comprising:
sensing a starting state of the vehicle;
sensing a speed of the vehicle;
sensing a gear state of the vehicle; and
determining whether automatic driving-out is available so as to determine that automatic driving-out is available when the starting state of the vehicle is changed from an OFF state to an ON state, the speed of the vehicle is less than a reference speed, and the gear state is "Neutral" or "Park" when a signal instructing automatic parking of the vehicle is received from a driver; and
controlling the driving-out of the vehicle when it is determined that the automatic driving-out of the vehicle is available.

8. The method of claim 7, wherein the determining of whether automatic driving-out is available includes: determining that the automatic driving-out is unavailable when a case in which the speed of the vehicle exceeds the reference speed exists after the starting state of the vehicle has been changed from the OFF state to the ON state.

9. The method of claim 7, wherein the determining of whether automatic driving-out is available includes: determining that the automatic driving-out is unavailable when a moving distance of the vehicle exceeds a reference distance after the staring state of the vehicle has been changed from the OFF state to the ON state.

10. The method of claim 7, wherein the determining of whether automatic driving-out is available: includes determining that the automatic driving-out is unavailable when a control of automatically changing the starting state to the OFF state is performed when the vehicle is stopped.

11. The method of claim 7, wherein the determining of whether automatic driving-out is available includes: determining that the automatic driving-out is unavailable when a signal instructing an automatic parking of the vehicle is received from the driver after it has been determined not to control the vehicle because the starting state of the vehicle is not changed from the OFF state to the ON state, the speed of the vehicle is not less than the reference speed, or the gear state of the vehicle is neither "Neutral" nor "Park".

12. The method of claim 11, wherein, when the starting state of the vehicle is changed from the OFF state to the ON state or the automatic parking of the vehicle is performed after it has been determined that the automatic driving-out is unavailable, the determining of whether automatic driving-out is available includes: determining that the automatic parking driving-out is available when the signal instructing the automatic parking of the vehicle is received from the driver.

* * * * *